United States Patent [19]
Wilson

[11] Patent Number: 5,431,284
[45] Date of Patent: * Jul. 11, 1995

[54] MULTI-LAYER COEXTRUDED POLYOLEFIN STRETCH WRAPPED PLURALITY OF GOODS

[75] Inventor: Greogry M. Wilson, Richmond Heights, Mo.

[73] Assignee: Mobil Oil Corporation, Fairfax, Va.

[ * ] Notice: The portion of the term of this patent subsequent to Sep. 14, 2010 has been disclaimed.

[21] Appl. No.: 120,503

[22] Filed: Sep. 14, 1993

Related U.S. Application Data

[60] Continuation of Ser. No. 850,536, Mar. 13, 1992, Pat. No. 5,248,547, which is a continuation-in-part of Ser. No. 662,136, Feb. 28, 1991, abandoned, which is a division of Ser. No. 262,407, Oct. 25, 1988, Pat. No. 5,019,315.

[51] Int. Cl.⁶ .................... B65D 19/00; B65B 53/00
[52] U.S. Cl. ........................... 206/597; 53/441; 428/218; 428/516; 428/911; 428/913; 206/386; 264/171; 264/514; 264/173
[58] Field of Search ........... 428/218, 516, 911, 913; 53/441, 170; 206/386, 597; 264/171, 514, 173

[56] References Cited

U.S. PATENT DOCUMENTS

| | | | |
|---|---|---|---|
| 4,436,788 | 3/1984 | Cooper | 428/483 |
| 4,820,589 | 4/1989 | Dobreski et al. | 428/422 |
| 5,019,315 | 5/1991 | Wilson | 264/171 |
| 5,248,547 | 9/1993 | Wilson | 428/128 |

Primary Examiner—P. C. Sluby
Attorney, Agent, or Firm—Alexander J. McKillop; Malcolm D. Keen; Clinton H. Hallman, Jr.

[57] ABSTRACT

The present invention relates to novel multi-layer coextruded thermoplastic stretch wrap films useful for the packaging or palletizing of goods. More particularly the films of this invention comprise at least three layers having two outer layers and at least one intermediate layer placed between the outer layers. The intermediate layer is formed from a high pressure low density polyethylene resin and the outer layers are formed from a linear low density polyethylene copolymer such as ethylene copolymerized with a minor amount of at least one $C_4$ to $C_{10}$ alpha-olefin, such as hexene-1, octene-1, decene-1, 4-methyl-pentene-1 and butene-1. The force required to stretch the novel films of this invention may be controlled by the thickness of the intermediate layer relative to overall film thickness, the melt index of the intermediate layer resin, the molecular weight of the intermediate layer resin or a combination thereof.

7 Claims, 1 Drawing Sheet

MULTI-LAYER COEXTRUDED POLYOLEFIN STRETCH WRAPPED PLURALITY OF GOODS

RELATED APPLICATIONS

This is a continuation of pending application Ser. No. 07/850,536, filed on Mar. 13, 1992, now U.S. Pat. No. 5,248,547, which is a continuation-in-part of application Ser. No. 07/662,136, filed on Feb. 28, 1991 now abandoned, which is a division of application Ser. No. 07/262,407, filed on Oct. 25, 1988, now U.S. Pat. No. 5,019,315.

FIELD OF THE INVENTION

The present invention is directed to stretch wrap polyolefinic films and methods for their production. In particular, the invention is concerned with a three layer coextruded film having an intermediate layer of high pressure low density polyethylene for strength, the thickness of which can be selected to provide a desired stretch force required to stretch the film during use, and two outer layers of linear low density polyethylene. The films of this invention are particularly useful for the wrapping of palletized loads.

BACKGROUND OF THE INVENTION

The use of thermoplastic stretch wrap films for the overwrap packaging of goods, and in particular, the unitizing of palleted loads, is a commercially significant application of polymer film, including generically, polyethylene. Overwrapping a plurality of articles to provide a unitized load can be achieved by a variety of techniques. In one procedure, the load to be wrapped is positioned upon a platform, or turntable, which is made to rotate and in so doing, to take up stretch wrap film supplied from a continuous roll. Braking tension is ap the film roll so that the film is continuously subjected to a stretching, or tensioning, force as it wraps around the rotating load in overlapping layers. Generally, the stretch wrap film is supplied from a vertically arranged roll positioned adjacent to the rotating pallet load. Rotational speeds of from about 5 to about 50 revolutions per minute are common. At the completion of the overwrap operation, the turntable is completely stopped and the film is cut and attached to an underlying layer of film employing tack sealing, adhesive tape, spray adhesives, etc. Depending upon the width of the stretch wrap roll, the load being overwrapped can be shrouded in the film while the vertically arranged film roll remains in a fixed position. Alternatively, the film roll, for example, in the case of relatively narrow film widths and relatively wide pallet loads, can be made to move in a vertical direction as the load is being overwrapped whereby a spiral wrapping effect is achieved on the packaged goods. Another wrapping method finding acceptance in industry today is that of hand wrapping. In this method, the film is again arranged on a roll, however, it is hand held by the operator who walks around the goods to be wrapped, applying the film to the goods. The roll of film so used may be installed on a hand-held wrapping tool for ease of use by the operator.

Some of the properties desired of a good stretch wrap film are as follows:
Good cling or cohesion properties.
Good transparency.
Good opacity.
Low stress relaxation with time.
High resistance to transverse tear when under machine direction tension.
Producible in thin gauges.
Low specific gravity and thus high yield in area per pound.
Good tensile toughness.
High machine direction ultimate tensile strength.
High machine direction ultimate elongation.
High modulus of elasticity.
High puncture resistance.

Physical properties which are particularly significant for the successful use of thermoplastic films in stretch wrap applications include their puncture resistance, their elongation characteristics, their toughness, and their resistance to tearing while under tension. In general, tensile toughness is measured as an area under a stress-strain curve developed for a thermoplastic film, and it may be considered as the tensile energy absorbed, expressed in units of ft.-lbs./cu. in. to elongate a film to break under tensile load. In turn, this toughness characteristic is a function of the capacity of such films to elongate. The process of stretching the film decreases that capacity. Accordingly, the stretch wrap process will decrease the toughness of the film while it is in its stretched condition as an overwrap as compared to unstretched counterparts, including such materials as shrink wrap. Generally this loss of toughness is proportional to the amount of stretch imparted to the film as it is overwrapping a load of goods.

As hereinabove indicated, the resistance to tear characteristic of such films will obviously be an important physical characteristic for stretch wrap applications since if the edge of the stretch film roll is nicked, abraded or in any way weakened before stretching or during the stretching operation, premature tearing of the film will usually occur during wrapping or subsequent handling of the load of goods.

Some resins which have been used in the fabrication of stretch wrap film are polyethylene, polyvinylchloride and ethylene vinyl acetate. A fairly recent development has been the utilization of linear low density polyethylene (LLDPE) in the manufacture of stretch wrap film, e.g., as described in U.S. Pat. Nos. 4,399,180, 4,418,114 and 4,518,654, the contents of which are incorporated by reference herein. The excellent toughness and puncture resistance properties of LLDPE makes it an excellent resin for such an application. LLDPE and methods for its manufacture are described in, among others, U.S. Pat. Nos. 3,645,992, 4,076,698, 4,011,382, 4,163,831, 4,205,021, 4,302,565, 4,302,566, 4,359,561 and 4,522,987. In general, films fabricated from the typical LLDPE resins of commerce possess little or no cling property on either surface thereof in the absence of added cling agent. LLDPE films possessing an inherent cling property wherein the LLDPE possesses a relatively high level of n-hexane extractables are disclosed in Application Ser. No. 039,892, filed Apr. 17, 1987, the contents of which are incorporated by reference in their entirety.

Other thermoplastic films possessing a cling property are known in the art. U.S. Pat. No. 4,311,808 describes a cling film containing a homogeneous mixture of polyisobutylene, ethylene-propylene and a low density polyethylene.

U.S. Pat. No. 4,367,256 describes a cling wrap plastic film based on a blend of high pressure low density polyethylene (HPLDPE) and LLDPE in which the latter resin represents from 5–16 weight percent of the total. In one embodiment, this film is sandwiched between two HPLDPE films.

U.S. Pat. No. 4,399,173 describes a multilayer plastic film free of melt fracture which is suitable for a variety of applications including, by implication, the stretch wrapping of goods. The film possesses a core layer of LLDPE resin of melt index 0.2–3.0 decigrams per minute and skin layers of LLDPE resin of melt index 5.0–20.2 decigrams per minute.

U.S. Pat. Nos. 4,399,180 and 4,418,114 describe a coextruded composite stretch wrap film in which an LLDPE core layer is surfaced with HPLDPE skin layers.

In the one-sided cling stretch wrap film of U.S. Pat. No. 4,518,654, layer A of the disclosed A/B structure is fabricated from a resin possessing an inherent cling property and/or a cling property resulting from the incorporation of a cling additive therein. Layer A is coextruded with layer B, which is fabricated from a resin exhibiting little if any cling. Layer B further exhibits a slide property when in contact with a layer of itself with relative motion therebetween. Layer B can contain an anti-cling additive at a level of from about 0.05 to about 2.0 weight percent of the resin component of the layer, and can consist of such materials as crystalline and amorphous silicate. In each of the two working examples of this patent, layer A is an LLDPE film containing a cling additive, namely, polyisobutylene, with synthetic sodium silicate particles being uniformly incorporated throughout layer B of the film of Example 1 and amorphous silica particles being uniformly incorporated throughout layer B of the film of Example 2. Layer B, the layer providing the noncling surface of the films of Examples 1 and 2 is HPLDPE. Improved one-sided cling/one-sided slip stretch wrap films are disclosed in Application Ser. No. 249,525, filed Sep. 26, 1988.

Other multi-layer composite films known include those disclosed in U.S. Pat. No. 4,364,981 in which polyethylene films comprising a core or intermediate layer of low pressure low density polyethylene (LPLDPE) and skin layers of high pressure low density polyethylene (HPLDPE) are taught. The LPLDPE described within U.S. Pat. No. 4,364,981 is actually an LLDPE, as may be seen by reference to the process for making LLDPE of U.S. Pat. No. 4,011,382 disclosed at column 1, lines 52–55. The films disclosed are said to be useful in forming bags such as trash bags. No disclosure of possible utility as a stretch wrap may be found within this patent.

U.S. Pat. No. 4,565,720 discloses three layer packaging bags in which an intermediate layer comprising a mixture of LLDPE and high density polyethylene (HDPE) is taught. Outer layers of the bags are made of HPLDPE or a mixture of HPLDPE and an ethylene-vinyl acetate copolymer. The structures disclosed are not cited as being useful in forming stretch wrap films.

A multi-layer film in which the intermediate layer comprises LLDPE and HDPE and the outer layers comprise an LLDPE and at least one such outer layer further comprises an HPLDPE is disclosed in U.S. Pat. No. 4,574,104. One film disclosed therein is a three-layer structure in which the intermediate layer comprises LLDPE, HPLDPE and HDPE. Packaging bags are the chief utility cited for these multi-layer films. No disclosure of utility as a stretch wrap is made.

U.S. Pat. No. 4,511,609 discloses a multi-layer film for use in the manufacture of garbage bags wherein the film comprises a first outer layer of LLDPE, a second outer layer of HPLDPE and a intermediate layer also of HPLDPE or a blend of LLDPE and HPLDPE. No statement as to whether the films disclosed have any possible utility as stretch wraps is made within this patent.

In U.S. Pat. No. 4,657,811, a three-layer plastic film suitable for use in trash bag manufacturing is disclosed wherein an intermediate layer of foamed HPLDPE is disposed between outer layers of LLDPE. Again, the films disclosed are not cited as finding utility as stretch wrap films.

As previously indicated, methods of stretch wrapping articles, containers, etc., are known. U.S. Pat. No. 3,986,611 describes a tension-wrapped palletized load obtained with a stretch wrap film possessing a cling additive.

U.S. Pat. No. 4,079,565 describes a stretch-wrapped package, process and apparatus which employs a stretch wrap polyethylene film.

U.S. Pat. No. 4,409,776 discloses a method and apparatus for packaging articles with a composite stretch wrap film, one surface of which is nonadhesive. The adhesive surface is obtained with an "adhesive film" such as one fabricated from ethylene-vinyl acetate copolymer, 1,2-polybutadiene or styrenebutadiene copolymer and the nonadhesive surface is obtained with a "nonadhesive film" such as one fabricated from a crystalline polyolefin, e.g., polyethylene, polypropylene or ethylene-propylene copolymer.

While it is apparent that a wide variety of stretch wrap films have been disclosed for use in packaging or palletizing operations, virtually all suffer from one or more notable deficiencies. Not all films known in the art possess good on-load stretched cling properties. Other films are deficient in their tensile properties, including the force required in the machine direction (MD) to stretch the film. Still, not all end use applications require the same film characteristics, necessitating the complex production of a broad range of films to suit these applications.

It is therefore an object of the present invention to provide a novel multi-layered coextruded film which exhibits good stretched cling and sufficient machine direction force to stretch which is useful in industrial pallet wrapping applications, It is another object of the present invention to provide novel multi-layered coextruded stretch wrap films in which the amount of force required to stretch the film is controlled by regulating the thickness of the intermediate layer of the film.

It is yet another object of the present invention to provide novel multi-layered coextruded stretch wrap films in which the amount of force required to stretch the film is controlled by the melt index and/or molecular weight distribution of the intermediate layer.

It is still a further object of the present invention to provide a process for the production of the novel films of this invention.

It is yet a further object to overcome the aforementioned problems in an effective and economical manner.

Other objects of the invention include the use of a stretch wrap film of the aforementioned characteristics in the overwrapping of a plurality of goods, e.g., a pallet load, to provide a unitized packaged unit.

Further objects of this invention will become apparent from a reading of the specification and appended claims.

SUMMARY OF THE INVENTION

In accordance with the present invention, a thermoplastic stretch wrap film is provided which comprises at least three layers, the three layers having two outer layers and an intermediate layer positioned between the outer layers. The intermediate layer is produced from a high pressure low density polyethylene and the two outer layers are produced from a linear low density polyethylene consisting essentially of ethylene copolymerized with a minor amount of at least one alpha olefin having from 4 to 10 carbon atoms. In one embodiment, the force required to stretch the film is controlled by regulating intermediate layer thickness; intermediate layer thickness being proportional to the force required to stretch the film.

In another embodiment, the force required to stretch the film is controlled by the melt index and/or molecular weight distribution of the intermediate layer.

According to another aspect of the invention, there is provided a method for producing the films of this invention.

DETAILED DESCRIPTION OF THE INVENTION

Figure 1:
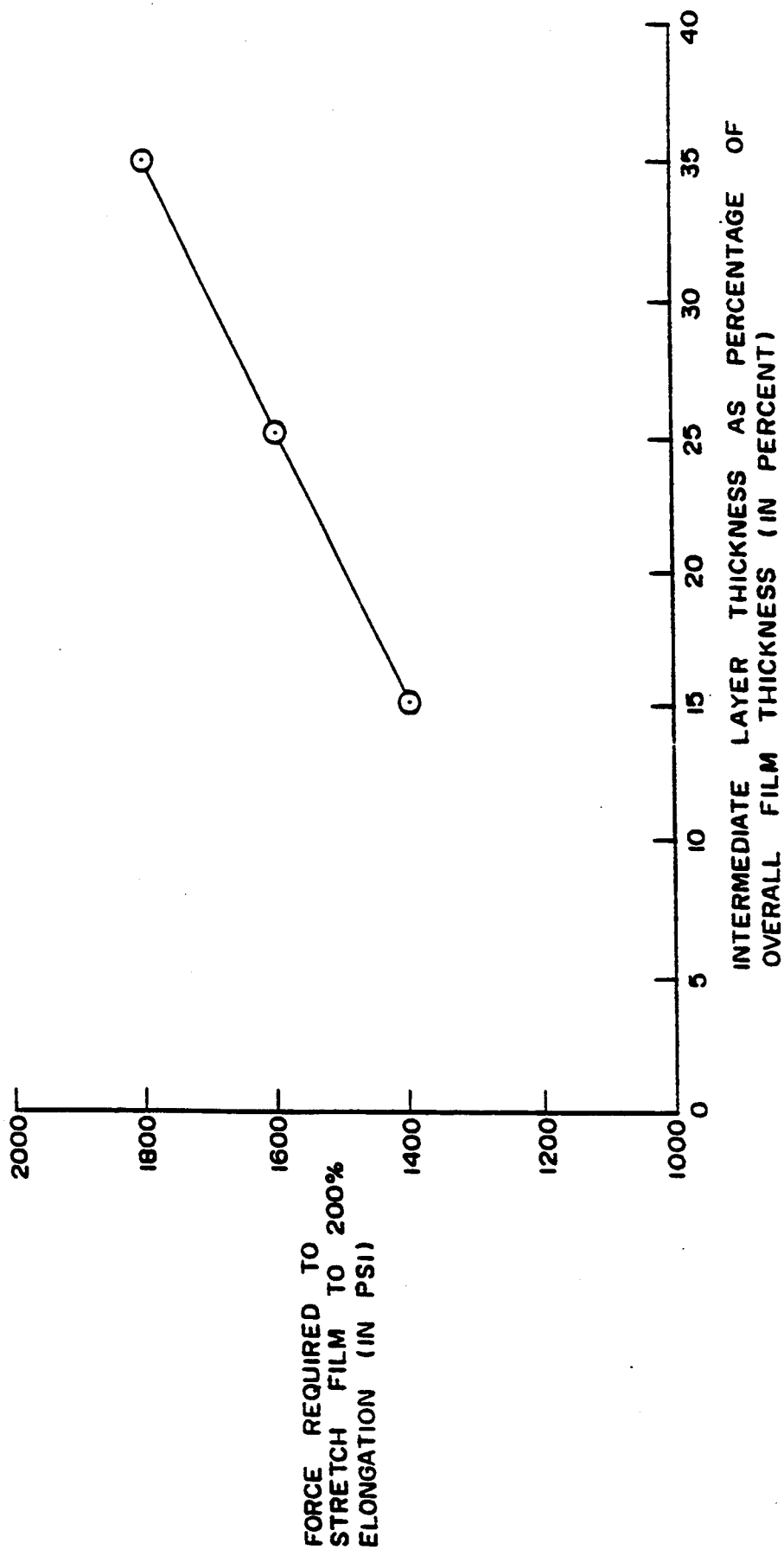
FIG. 1 is a functional relationship between intermediate layer thickness as a percentage of overall film thickness versus the force repaired to stretch the film to 200% elongation.

The present invention comprises the formation of a laminar stretch wrap thermoplastic film by initially preparing the coextruded stretch wrap product utilizing conventional coextrusion techniques. The material construction of the laminate prepared in accordance with the following examples comprises an intermediate layer of highly branched low density polyethylene resin produced by the high pressure process. The high pressure low density polyethylene (HPLDPE) intermediate layer provides the requisite strength and toughness properties necessary for stretch film applications.

The olefin polymer resins employed to make the outer layers of the stretch wrap films of the present invention are those ethylenic copolymers which comprise a major proportion by weight of ethylene copolymerized with a minor proportion by weight of an alpha olefin monomer containing 4 to 10 carbon atoms. Such ethylenic copolymers as mentioned are commonly referred to as linear low density polyethylenes (LLDPE). By the use of the term minor proportion by weight of an alpha olefin monomer is meant a proportion which does not exceed the proportion, by weight, of ethylene present in the copolymer, in other words, a proportion of alpha olefin monomer less than 50 weight percent. Preferably the ethylenic copolymers employed are those having from about 1 to about 20 weight percent of said higher alpha olefin monomer copolymerized therein. In addition, it is also preferred that the alpha olefin monomer employed in the ethylenic copolymer be selected from the group consisting of butene-1, 3-methyl-butene-1, 3-methyl-pentene-1, hexene-1, 4-methyl-pentene-1, 3-methyl-hexene-1, octene-1 and decene-1. Particularly preferred are the hexene-1 alpha olefins. The LLDPE resins are prepared at relatively low pressures employing coordination-type catalysts. Reference may be made to U.S. Pat. Nos. 3,645,992, 4,076,698, 4,011,382, 4,163,831, 4,205,021, 4,302,565, 4,302,566, 4,359,561 and 4,522,987 for more details of the manufacture and properties of LLDPE resins including those which are particularly useful herein.

As discussed above, Application Ser. No. 039,892 disclosed the discovery that certain LLDPE resins can possess an inherent cling property in the absence of added cling agents. Those resins were found to possess a relatively high weight percentage of n-hexane extractibles, as measured by the n-hexane extractibles method of 21 C.F.R. 177.1520. Although it has not been confirmed that the n-hexane extractibles are, in fact, the cause of the inherent cling property of the stretch wrap film disclosed in Ser. No. 039,892, a correlation between cling and the level of such extractibles was disclosed therein, lending support to the view that the extractibles are indeed responsible for the cling behavior. These LLDPE resins are particularly preferred in the practice of the present invention. Preferably, the LLDPE used in the outer film layers herein will contain from about 4 to about 10 and still more preferably, from about 5 to about 8, weight percent of n-hexane extractibles.

The LLDPE resins of this invention have a density ranging from about 0.905 to about 0.940 gm/c.c. and a melt index of from about 1 to about 10. Particularly preferred are those LLDPE resins possessing densities within the range from about 0.917 to 0.920 gm/c.c. and melt indices within the range from about 2.0 to 5.0.

The LLDPE resin can be blended or alloyed with minor amounts, e.g., up to about 20 weight percent total, of one or more other suitable resins to achieve a desired range of physical/mechanical properties in the film product. Thus, for example, such resins as EVA copolymer, HPLDPE and other LLDPE resins may be used for blending to obtain useful mixtures for forming the outer layers of the films of this invention.

The LLDPE resins which are useful herein can also contain known and conventional cling additives to augment the cling property which, at least in the case of the particularly preferred resins, is inherently exhibited. Examples of useful cling additives include polyisobutylenes having a number average molecular weight in the range of from about 1,000–3,000 grams per mole as measured by vapor phase osmometry, amorphous atactic polypropylenes, e.g., those having an average molecular weight of about 2000, polyterpenes and ethylene-vinyl acetate copolymers containing from about 5–15 weight percent copolymerized vinyl acetate. As disclosed in Ser. No. 249,525, filed Sep. 26, 1988, hereby incorporated by reference in its entirety, polyisobutylene having a number average molecular weight exceeding 2500 has been found to exhibit the unusual benefits of reduced additive migration and reduced surface transfer (pickoff). As such, these are the more preferred agents for use in this invention. The optional cling additive can be present in the outer layers in a concentration of from about 0.5 to about 10 pounds per 100 pounds of resin. Of course, other conventional film additives such as antioxidants, UV stabilizers, pigments, dyes, etc., can be present in the usual amounts.

The high pressure low density polyethylenes (HPLDPE) useful in the practice of this invention are those having a density within the range from about 0.905 to about 0.940 gm/c.c., with a melt index within the range from about 1 to 25. Particularly preferred are those HPLDPE's having a density within the range from about 0.918 to about 0.922 gm/c.c., with a melt index within the range from about 1.0 to 15.0. Still more preferred are those HPLDPE's having a melt index within the range from about 1.0 to 10.0. As will be described in more detail below, HPLDPE's having broad or narrow molecular weight distributions are useful in the practice of this invention, with the selection of a preferred distribution dependent upon the resultant film requirements.

The multi-layer film compositions of this invention have been found to provide good stretched cling and high machine direction force to stretch which are desirable features in industrial pallet wrapping applications. In one embodiment, the amount of force required to stretch the film is controlled by the thickness of the HPLDPE intermediate layer. In the processing of the films of this invention, the thickness of the intermediate is effectively adjusted by increasing or decreasing the speed of the HPLDPE extruder. This feature permits the manufacturing process to be easily manipulated to produce a film which is customized for a particular pallet wrapping application. The amount of force required to stretch the resultant multi-layer films of this invention has been found to be directly proportional to intermediate layer thickness; that is, the greater the intermediate HPLDPE layer thickness as a percentage of the overall film thickness, the greater the force required to stretch the film.

As disclosed above, it has been found that tensile properties of the multi-layer films of this invention can be controlled or varied by controlling the melt index and/or the molecular weight distribution of the HPLDPE intermediate layer. The amount of force required to stretch the finished, coextruded multi-layer films of this invention has been found to vary inversely with an increase in the melt index of the intermediate layer; that is an increase in the melt index of the HPLDPE resin used in extruding the intermediate layer will result in a multi-layer film requiring less force to stretch the film to the same extent, all other relevant parameters held constant. The molecular weight distribution of the HPLDPE resin used in extruding the intermediate layer has also been found to influence the force required to stretch the films of this invention; with an increase in molecular weight distribution resulting in an increase in the force required to stretch the resultant multi-layer film. Molecular weight distribution (MWD) may be expressed as the ratio of weight average molecular weight (Mw) to number average molecular weight (Mn). The larger the value of this ratio, the broader the distribution of molecular weights. It is within the scope of this invention to vary the melt index and molecular weight distribution of the HPLDPE resin either independently or in combination therewith to achieve the desired end result. Likewise, the thickness of the intermediate layer in relation to the overall film thickness may be varied independently of melt index and/or molecular weight distribution or in combination therewith to achieve the desired stretch characteristics.

The film thickness, of these multi-layer films can vary widely and in general, can be a thickness which is typical for stretch wrap films. A total film thickness of from about 0.4 to about 2.5 mils, preferably from about 0.8 to about 2.0 mils, is suitable for most applications. In the case of multi-layer films constructed in accordance with this invention, the outer layers together can represent from about 50 to about 98, and preferably from 60 to about 95, percent of the total gauge thickness with the intermediate layers representing the balance of the thickness.

Either or both major surfaces of the film can be treated by such known and conventional post-forming operations as corona discharge, chemical treatment, flame treatment, etc., to modify the printability or ink receptivity of the surface(s) or to impart other desirable characteristics thereto.

The stretch wrap film of this invention can, if desired, be provided in the non-stretched, i.e., unoriented, or at most only modestly stretched, state prior to use. Thus, the film herein can be capable of undergoing stretch from less than about 50 to about 500, and preferably from about 75 to about 400, linear percent during the overwrapping operation.

It is preferred to employ known and conventional techniques of coextrusion to assemble the composite structures of the films of this invention. Reference may be made to U.S. Pat. No. 3,748,962, the contents of which are incorporated by reference herein, for details of a coextrusion procedure which can be employed in the fabrication of a multilayer film in accordance with this invention.

The pallet unitizing techniques described in U.S. Pat. Nos. 3,986,611 and 4,050,221 are contemplated herein. The disclosures of these patents are incorporated herein in their entirety by reference.

The following demonstrate the extent of the unexpected results obtained with the multi-layer stretch wrap films of the present invention. The invention is illustrated by the following non-limiting examples:

EXAMPLES 1-3

Utilizing the aforementioned method of extrusion, three three-layer (A/B/A) coextrusions were produced, as shown below, to compare film properties resulting from varying the thickness of the intermediate, B, layer as a percentage of the overall film thickness. All examples were produced on a production cast line using a die block arrangement that provided a tapered core profile. These films were produced at 1.20 mil gauge, with melt temperatures of approximately 540°–550° F. for the outer, A, layers of LLDPE and 490°–500° F. for the intermediate, B, HPLDPE layer. Film thickness was varied by changing the speed of the HPLDPE extruder.

| Ex. | Layer | Percent of Total Film Thickness | Polyethylene Component | Force Required To Stretch Film To 200% Elongation |
|---|---|---|---|---|
| 1 | A | 42.5% | [1]Exxon 3003.37 LLDPE, 0.918 gm/cc, MI = 3.3 | 1400 psi |
|  | B | 15% | DOW 501 HPLDPE 0.92 gm/cc, MI = 1.9 Narrow MWD[2] |  |
|  | A | 42.5% | Exxon 3003.37 LLDPE, 0.918 gm/cc, MI = 3.3 |  |
| 2 | A | 37.5% | Exxon 3003.37 LLDPE, 0.918 gm/cc MI = 3.3 | 1600 psi |
|  | B | 25% | DOW 501 HPLDPE 0.92 gm/cc, MI = 1.9 Narrow MWD |  |
|  | A | 37.5% | Exxon 3003.37 LLDPE, 0.918 gm/cc MI = 3.3 |  |

| Ex. | Layer | Percent of Total Film Thickness | Polyethylene Component | Force Required To Stretch Film To 200% Elongation |
|---|---|---|---|---|
| 3 | A | 32.5% | Exxon 3003.37 LLDPE, 0.918 gm/cc MI = 3.3 | 1800 psi |
|   | B | 35% | DOW 501 HPLDPE 0.92 gm/cc, MI = 1.9 Narrow MWD | |
|   | A | 32.5% | Exxon 3003.37 LLDPE, 0.918 gm/cc MI = 3.3 | |

[1] Exxon 3003.37 LLDPE is a hexene-1-based ethylene copolymer
[2] Mw/Mn is equal to about 5.5.

While no cling agent was employed in the manufacture of these films, the films of Examples 1–3 were found to exhibit good, on-load stretched cling due to the use of the hexene-based LLDPE to form the outer skin layers of the films. The LLDPE used is known to possess a relatively high level of n-hexane extractables which is believed to result in good inherent cling. As shown, the force required to stretch the film to 200% elongation was measured to be within the range of 1400 to 1800 psi for the films of Examples 1–3. The functional relationship between intermediate layer thickness as a percentage of overall film thickness versus the force required to stretch the resultant film to 200% elongation is shown in FIG. 1. As shown in FIG. 1, a linear relationship was observed for the films of these examples.

Additionally, the films with higher intermediate layer percentages were found to exhibit good load retention characteristics and excellent optics due to the lack of transverse direction (TD) banding, known within the art as "tiger striping".

EXAMPLES 4–6

Employing the extrusion methods previously described, three additional three-layer (A/B/A) coextrusions were produced. In Examples 4–6, the HPLDPE resin properties were varied to demonstrate the impact of melt index and molecular weight distribution on the overall film characteristics of the A/B/A structure. Examples 4–6 were produced on a 30-inch wide cast line at an extrusion rate of 150 lbs/hr. These films were produced at 1.20 mil gauge, with melt temperatures of approximately 470°–490° F. for the LLDPE outer layers and 395°–400° F. for the HPLDPE intermediate layer.

| Ex. | Layer | Percent of Total Film Thickness | Polyethylene Component | Force Required To Stretch Film To 200% Elongation |
|---|---|---|---|---|
| 4 | A | 40% | [1]Exxon 3003.37 LLDPE, 0.918 gm/cc, MI = 3.3 | 1500 psi |
|   | B | 20% | DOW 748 HPLDPE 0.92 gm/cc, MI = 7.0 Narrow MWD[2] | |
|   | A | 40% | Exxon 3003.37 LLDPE, 0.918 gm/cc, MI = 3.3 | |
| 5 | A | 40% | Exxon 3003.37 LLDPE, 0.918 gm/cc MI = 3.3 | 2200 psi |
|   | B | 20% | DOW 501 HPLDPE 0.92 gm/cc, MI = 1.9 Narrow MWD | |
|   | A | 40% | Exxon 3003.37 LLDPE, 0.918 gm/cc MI = 3.3 | |
| 6 | A | 40% | Exxon 3003.37 LLDPE, 0.918 gm/cc MI = 3.3 | 2400 psi |
|   | B | 20% | DOW 536 HPLDPE 0.92 gm/cc, MI = 2.0 Broad MWD[3] | |
|   | A | 40% | Exxon 3003.37 LLDPE, 0.918 gm/cc MI = 3.3 | |

[1] Exxon 3003.37 LLDPE is a hexene-1-based ethylene copolymer
[2] Mw/Mn is equal to about 5.5
[3] Mw/Mn is equal to about 8.5.

As with the films of Examples 1–3, no cling agent was employed in the outer skin layers. The films of Examples 4–6 exhibited good on-load stretched cling due to the use of the hexene-based LLDPE outer layers. The force required to stretch the film to 200% elongation was found to be between 1500 and 2400 psi for the films of Examples 4–6. As may be seen, the force required to stretch the film was controlled by the melt index and/or the molecular weight distribution of the intermediate, B, layer. In various industrial-type stretch wrapping applications, the films exhibited good load retention characteristics as well as good resistance to puncture and tear.

By comparing the values for the force required to stretch the multi-layer film to 200% of Examples 4 and 5, it may be seen that with a decrease in the HPLDPE resin's melt index, an increase in force required was observed. By comparing the stretch force values for the films of Examples 5 and 6, it may be seen that an increase in the molecular weight distribution of the HPLDPE resin of the intermediate layer brought about an increase in the force required to stretch the film to 200% elongation.

Although the present invention has been described with preferred embodiments, it is to be understood that modifications and variations may be utilized without departing from the spirit and scope of this invention, as those skilled in the art will readily understand. Such modifications and variations are considered to be within the purview and scope of the appended claims.

What is claimed is:

1. A unitized plurality of goods comprising:
a plurality of goods having a polyethylene stretch wrap film layer on about the girth of said goods in stretched condition, the end region of said film being attached to a previous layer of said film;
said polyethylene stretch wrap film comprising coextruded three-layer thermoplastic film having two outer layers and an intermediate layer positioned between said outer layers, said outer layers comprising a linear low density polyethylene, said linear low density polyethylene consisting essentially of ethylene copolymerized with about 1 to 20 weight percent total of at least one alpha olefin having form 4 to 10 carbon atoms and said intermediate layer consisting essentially of high pressure low density polyethylene.

2. The unitized goods of claim 1, wherein said unitized goods is a unitized pallet load.

3. The unitized goods of claim 2, wherein said alpha olefin is a member selected from the group consisting of butene-1, 4-methyl pentene-1, hexene-1, octene-1, or mixtures thereof.

4. The unitized goods of claim 3, wherein said linear low density polyethylene has a melt index from about 2.0 to 5.0 and a density from about 0.917 to 0.920 grams/c.c. and said alpha olefin is hexene-1.

5. The unitized goods of claim 4, wherein said intermediate layer of high pressure low density polyethylene has a density of about 0.918 to 0.922 grams/c.c. and a melt index of about 1.0 to 15.0.

6. The unitized goods of claim 5, wherein said intermediate layer thickness is between about 5 and 40 percent of overall film thickness.

7. In a method for unitizing a plurality of goods including:

laying on, about the girth of said goods, a polyethylene stretch wrap film form a source thereof while rotating said goods;

at the completion of unitizing, cutting the wrapping film free of said source and attaching the same to the previous layer of wrapped film;

the improvement comprising, employing as the polyethylene stretch wrap film a film comprising an intermediate layer positioned between two outer layers, said outer layers comprising a linear low density polyethylene, said linear low density polyethylene consisting essentially of ethylene copolymerized with about 1 to 20 weight percent total of at least one alpha olefin having from 4 to 10 carbon atoms and said intermediate layer consisting essentially of high pressure low density polyethylene.

* * * * *